Patented June 2, 1925.

1,540,467

UNITED STATES PATENT OFFICE.

HANS EDUARD FIERZ, OF KILCHBERG, NEAR ZURICH, SWITZERLAND, ASSIGNOR TO SOCIETY "CHEMICAL WORKS" FORMERLY SANDOZ, OF BASEL, SWITZERLAND.

MANUFACTURE OF PURE 1-NITRO-2-METHYLANTHRAQUINONE.

No Drawing. Application filed August 9, 1924. Serial No. 731,212.

*To all whom it may concern:*

Be it known that I, HANS EDUARD FIERZ, a citizen of the Swiss Confederation, and residing at Kilchberg, near Zurich, Switzerland, have invented new and useful Improvements in the Manufacture of Pure 1-Nitro-2-Methylanthraquinone, of which the following is a full, clear, and exact specification.

The present invention relates to pure 1-nitro-2-methylanthraquinone.

Crude nitromethylanthraquinone contains a considerable number of isomers. It has been found that the crude product may be easily purified by heating it for some time with salts of sulfurous acid in an aqueous suspension. The 1-nitro-2-methylanthraquinone is not changed by this operation, whilst the isomers, of which probably two have been ascertained up to now, will go into solution as sulfo acids. The purified 1-nitro-2-methylanthraquinone yields at once a chemically pure 1-amino-2-methylanthraquinone when treated with sodium sulfide. The bromo- and other derivatives obtained therefrom are very pure and melt in part at a temperature which is 40–50° C. higher than has been observed hitherto.

The following examples illustrate the invention, the parts being by weight:—

*Example 1.*

The crude nitro-product obtained from 1 part of 2-methylanthraquinone, which has first been washed neutral, is made into a paste with some water. Thereto there are added 3 parts of sodium sulfite dissolved in 50 parts of water. The whole is heated for five hours in a reflux apparatus. The product of the reaction is filtered hot and washed with hot water. Yield: 75–80% of the theoretical.

*Example 2.*

111 parts of methylanthraquinone are nitrated as usual. The moist nitration product is introduced into an aqueous solution of 333 parts of sodium sulfite in about 1800 to 2000 parts of water and heated in an autoclave for 6 hours to 110–115° C. After cooling the whole is filtered by suction and thoroughly washed with boiling water.

What I claim is:

1. The process for the manufacture of pure 1-nitro-2-methylanthraquinone, consisting in heating for some time the crude nitromethylanthraquinone in an aqueous suspension with salts of sulfurous acid.

2. The process for the manufacture of pure 1-nitro-2-methylanthraquinone, consisting in heating for some time the crude nitromethylanthraquinone in an aqueous suspension with salts of sulfurous acid under pressure.

3. The process for the manufacture of pure 1-nitro-2-methylanthraquinone, consisting in heating for some time the crude nitromethylanthraquinone in an aqueous suspension with sodium sulfite under pressure.

In witness whereof I have hereunto signed my name this 23 day of July 1924, in the presence of two subscribing witnesses.

HANS EDUARD FIERZ.

Witnesses:
 WEB HENSON,
 OSSOKAR WOFICKER.